US012269055B2

(12) United States Patent
Melcher et al.

(10) Patent No.: US 12,269,055 B2
(45) Date of Patent: Apr. 8, 2025

(54) RINSING APPARATUS FOR CONNECTION TO AN APPLICATION-AGENT MAIN CHANNEL OF AN APPLICATION-AGENT CHANGEOVER UNIT

(71) Applicant: Dürr Systems AG, Bietigheim-Bissingen (DE)

(72) Inventors: Rainer Melcher, Oberstenfeld (DE); Thomas Appel, Bönnigheim (DE); Markus Erhardt, Freiberg am Neckar (DE); Manfred Michelfelder, Steinheim (DE); Frank Herre, Oberriexingen (DE)

(*) Notice: Subject to any disclaimer, the term of this patent is extended or adjusted under 35 U.S.C. 154(b) by 200 days.

(21) Appl. No.: 17/800,260

(22) PCT Filed: Jan. 22, 2021

(86) PCT No.: PCT/EP2021/051452

§ 371 (c)(1),
(2) Date: Aug. 17, 2022

(87) PCT Pub. No.: WO2021/164982

PCT Pub. Date: Aug. 26, 2021

(65) Prior Publication Data

US 2023/0118476 A1 Apr. 20, 2023

(30) Foreign Application Priority Data

Feb. 19, 2020 (DE) ..................... 10 2020 104 325.2

(51) Int. Cl.
*B05B 7/12* (2006.01)
*B05B 12/14* (2006.01)

(52) U.S. Cl.
CPC .......... *B05B 7/1263* (2013.01); *B05B 12/149* (2013.01)

(58) Field of Classification Search
CPC ............................ B05B 7/1263; B05B 12/149
See application file for complete search history.

(56) References Cited

U.S. PATENT DOCUMENTS 3,179,341 A * 4/1965 Plos ........................ E04F 21/12
239/311
4,902,352 A 2/1990 Christian
(Continued)

FOREIGN PATENT DOCUMENTS

DE 3151929 A1 7/1983
DE 102007023238 A1 11/2008
(Continued)

OTHER PUBLICATIONS

German Office Action mailed Oct. 8, 2020 for Application No. DE 102020 104 325.2 (16 pages; with English machine translation).
(Continued)

*Primary Examiner* — P. MacAde Nichols
(74) *Attorney, Agent, or Firm* — Taft Stettinius & Hollister LLP; Thomas E. Bejin; John Wray Carpenter

(57) ABSTRACT

The disclosure relates to a rinsing apparatus for connection to an application-agent main channel of an application-agent changeover unit and preferably for the continuous inflow of a rinsing agent into a flow of rinsing air, having a main line for transporting rinsing air and having a rinsing-agent line for transporting a rinsing agent. The rinsing apparatus is distinguished in particular in that the rinsing-agent line opens out into the main line by way of a mouth opening in order to generate a preferable y continuous flow of a rinsing-air/rinsing-agent mixture for introduction into the application-agent main channel. The disclosure also relates to a corresponding rinsing method.

37 Claims, 7 Drawing Sheets

(56) References Cited

U.S. PATENT DOCUMENTS

| | | | |
|---|---|---|---|
| 5,072,881 | A | 12/1991 | Taube, III |
| 5,759,277 | A | 6/1998 | Milovich et al. |
| 2007/0291581 | A1 | 12/2007 | Ehrfeld et al. |
| 2015/0314315 | A1 | 11/2015 | Herre et al. |

FOREIGN PATENT DOCUMENTS

| | | | |
|---|---|---|---|
| DE | 102017101370 | A1 | 7/2018 |
| DE | 102017122488 | A1 | 3/2019 |
| EP | 1772194 | A2 | 4/2007 |
| EP | 2554275 | A1 | 2/2013 |
| JP | H06-170284 | A | 6/1994 |
| WO | 2009019984 | A1 | 2/2009 |

OTHER PUBLICATIONS

International Search Report and Written Opinion for PCT/EP2021/051452 mailed Apr. 14, 2021 (19 pages; with English translation).

Japanese Intellectual Property Office Notice of Office Action for related application No. 2022-549859 mailed Dec. 10, 2024 (9 pages; with English translation).

* cited by examiner

| | 54 | 53 | 60+61 | 2 (S2) | 1 (S1) |
|---|---|---|---|---|---|
| | Control air 1 | Control air 2 | Release valve | Rinsing agent (V) | Pulsed air (PL) |
| Basic pattern | off | off | closed | closed | closed |
| | on | off | open | open | closed |
| | on | on | open | open | open |
| Modification 1 | off | off | closed | closed | closed |
| | on | off | open | closed | open |
| | on | on | open | open | open |
| Modification 2 (interchange of V with PL additionally possible) | off | off | closed | closed | closed |
| | on | off | open | open | closed |
| | on | on | open | closed | open |

FIG. 11

RINSING APPARATUS FOR CONNECTION TO AN APPLICATION-AGENT MAIN CHANNEL OF AN APPLICATION-AGENT CHANGEOVER UNIT

CROSS-REFERENCE TO RELATED APPLICATIONS

This application is a national stage of, and claims priority to, Patent Cooperation Treaty Application No. PCT/EP2021/051452, filed on Jan. 22, 2021, which application claims priority to German Application No. DE 10 2020 104 325.2, filed on Feb. 19, 2020, which applications are hereby incorporated herein by reference in their entireties.

FIELD

The disclosure relates to a rinsing apparatus for connection to an application-agent main channel of an application-agent changeover unit (for example, a so-called colour changer) and, for example, for the continuous inflow of a rinsing agent into a flow of rinsing air. The disclosure also relates to an associated rinsing method.

BACKGROUND

FIGS. 12 and 13 illustrate a rinsing apparatus known from practice for rinsing a colour changer and an atomiser for painting motor vehicle bodies together with the associated rinsing program.

The rinsing apparatus includes a pulsed air valve 10' through which pulsed air S1' is provided to rinse the colour changer and the atomiser with pulsed air S1'.

The rinsing apparatus further includes a rinsing-agent valve 20' through which rinsing agent S2' is provided to rinse the colour changer and the atomiser with rinsing agent S2'.

Reference number 201' schematically denotes a main paint channel of the colour changer through which different paints are fed to the atomiser via a plurality of paint feeds.

The rinsing process is carried out according to FIG. 13 by the alternate and thus cyclical opening and closing of the pulsed air valve 10' and the rinsing-agent valve 20'. At the start of the rinsing process, rinsing is usually carried out with rinsing agent S2', in order to dissolve paint to be removed in the colour changer and atomiser with rinsing agent ST. At the end of the rinsing process, in particular the main paint channel 201' of the colour changer is blown dry with pulsed air S1'.

Gear wheels of a dosing pump not shown in FIGS. 12 and 13 between the colour changer and the atomiser are usually rinsed via a separate rinsing agent connection.

A disadvantage of the cyclical rinsing (switching) shown in FIG. 13 is, for example, the consumption of rinsing agent.

Rinsing agent consumption per colour change is relatively high due to the cyclical rinsing between pulsed air S1' and rinsing agent S2' and due to the separate rinsing agent connection on the dosing pump.

As well as relatively high consumption, it is also disadvantageous, for example, that the cyclical rinsing process usually takes up most of the available rinsing time, so that often it is not possible to blow all of the residual rinsing agent out of the rinsing circuit. When the next colour is applied, the residual rinsing agent can affect the new colour, in particular by changing its concentration. The paint thus affected cannot be used for painting and is therefore usually discarded.

Furthermore, aqueous rinsing agents for novel coating systems tend to increase foaming in combination with pulsed air, which can be problematic for blow-drying.

In addition, the pulsed air valve 10' in FIG. 12, which is disposed directly on the paint circuit, cannot be backwashed with rinsing agent S2'. Only pulsed air S1', with its drying effect, passes through the valve seat 60'+61'. If paint residues settle here, they become dried-in and, over time, prevent the pulsed air valve 10' from closing completely and tightly.

The valve seat 60' and the valve shut-off element 61' of the pulsed air valve 10' and the rinsing-agent valve 20' taper in the direction of flow and thus form a "positive valve seat". A disadvantage of this is, for example, that overpressures (for example pressure surges) from the main paint channel 201' and/or leaks in the pulsed air valve 10' can cause paint residues to find their way behind the valve seat 60' of the pulsed air valve 10' and, for example, adhere to it. If this contamination malfunction continues, paint and rinsing agent residues can also adhere to the pulsed air non-return valve 11' and, as a consequential fault, penetrate into the pneumatic cabinet or control cabinet (for example, reaching solenoid valves, etc.) and possibly even flood it. This can even create an explosion hazard. Furthermore, leaks in the pulsed air valve 10' during the painting process can cause pulsed air S1' to unintentionally enter the main paint channel 201' (process error).

BRIEF DESCRIPTION OF THE DRAWINGS

FIG. 11 shows possible switching states of a rinsing apparatus according to an embodiment of the disclosure.

DETAILED DESCRIPTION

Figure 1:
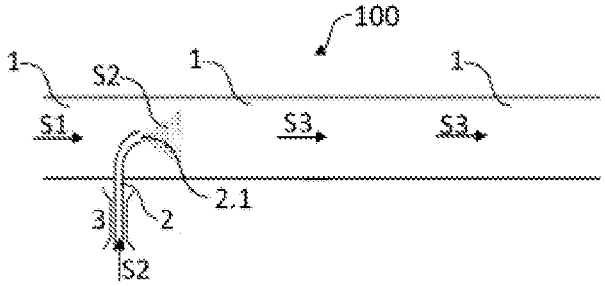
FIG. 1 shows a schematic view of a rinsing apparatus according to an embodiment of the disclosure.

The disclosure relates to a rinsing apparatus for connection to an application-agent main channel of an application-agent changeover unit (for example, a colour changer) and/or preferably for the continuous inflow of a rinsing agent (for example by spraying, in particular by injecting) into a flow of rinsing air.

The rinsing agent is preferably a rinsing liquid.

The rinsing air can be, for example, pulsed air (in particular pulsed rinsing air), but is preferably continuous and/or unpulsed rinsing air. The rinsing air flow can thus be a pulsed air flow or an unpulsed rinsing air flow, for example.

The rinsing apparatus includes a main line for transporting the rinsing air and a rinsing-agent line (in particular configured as a secondary line) for transporting the rinsing agent.

The rinsing apparatus is characterised in particular in that the rinsing-agent line opens out into the main line by way of a mouth opening (for example a nozzle, in particular a spray nozzle) in order to generate a (preferably continuous) flow of a rinsing-air/rinsing-agent mixture, in particular to be introduced into (in particular flow into) the application-agent main channel.

The rinsing-agent line therefore preferably connects to the main line in order to allow the rinsing agent to expediently flow, in particular to be injected, into the rinsing air.

Upstream of the mouth opening, the main line preferably serves to transport (in particular only) the rinsing air.

Downstream of the mouth opening, the main line serves in particular to transport a rinsing-air/rinsing-agent mixture and can thus form, for example, a manifold for the rinsing air and the rinsing agent and thus the rinsing-air/rinsing-agent mixture.

The rinsing apparatus preferably enables rinsing operation without alternately rinsing with rinsing air on the one hand and rinsing agent on the other.

In particular, this allows a continuous and preferably non-alternating inflow of rinsing agent (for example via a reduced cross-section (nozzle)) into the rinsing air flow.

It is possible that the rinsing-agent line has a smaller flow cross-section than the main line. Alternatively or additionally, the mouth opening can have a smaller flow cross-section than the main line, in particular in the outlet area of the mouth opening. The mouth opening can be formed as a spray nozzle, for example. However, embodiments are also possible in which the main line and the rinsing-agent line have substantially the same flow cross-section.

The rinsing-agent line can, for example, have a throttle point or a nozzle, preferably with an (expediently locally) reduced or narrowed flow cross-section.

The throttle point or nozzle can be disposed, for example, upstream of the mouth opening and/or downstream of a rinsing-agent valve. The mouth opening (configured as a spray nozzle, for example) can also be realised as a throttle point or nozzle.

The smaller flow cross-section, the throttle point and/or the mouth opening, preferably configured as a spray nozzle, make it possible in particular to reduce the consumption of rinsing agent and/or to increase the flow rate of the rinsing agent, which may preferably help to improve an aerosol effect (in particular atomisation effect).

The smaller flow cross-section, the throttle point and/or the mouth opening, preferably configured as a spray nozzle, preferably open out substantially directly into the main line.

It is possible that the rinsing agent can be introduced, in particular can be injected, into the flow of rinsing air and/or the main line (in particular via the mouth opening) in atomised form (for example as a spray) in order to advantageously produce an aerosol from rinsing air and rinsing agent. For this purpose, the mouth opening can, for example, be configured as a spray nozzle in order to inject the rinsing agent in atomised form (for example as a spray) into the flow of rinsing air and/or the main line. The aerosol is preferably generated by simultaneously opening a supply of rinsing air and rinsing agent and/or by atomising the rinsing agent into the flow of rinsing air.

The atomisation of the rinsing agent can be enabled and/or promoted in particular by the mouth opening, which is expediently formed as a spray nozzle, the smaller flow cross-section and/or the throttle point or nozzle.

The aerosol can be generated in particular by atomising the rinsing agent into the continuous flow of rinsing air.

It is possible that the rinsing agent can be continuously introduced, in particular injected in atomised form, into the rinsing air, in particular the rinsing air flow. For this purpose, the rinsing apparatus can, for example, comprise a valve control system which expediently provides for a switching position whereby rinsing air and rinsing agent are made available simultaneously in order to be mixed. This allows, for example, a continuous inflow of rinsing agent into the rinsing air, thereby generating a continuous flow of rinsing-air/rinsing-agent mixture.

It is possible that the rinsing-agent line and/or the mouth opening opens out into the main line substantially parallel to the direction of flow in the main line, or opens out into the main line at an angle to the direction of flow in the main line. This allows rinsing agent to be introduced into the main line preferably non-orthogonally to the direction of flow in the main line.

The mouth opening can, for example, be disposed substantially centrally in the flow cross-section of the main line or expediently open out into the main line from the outside.

It is possible that the rinsing apparatus has a valve shut-off element that widens in the direction of flow (for example substantially conically or in steps), and is thus in particular a negative valve shut-off element. Alternatively or additionally, the rinsing apparatus may comprise a valve seat that widens in the direction of flow (for example substantially conically or in steps) and is thus in particular a negative valve seat. This makes it possible, for example, that in the event of overpressure (for example a pressure surge) from the application-agent main channel, the valve shut-off element is pressed against the valve seat and thus into a closed position.

The (in particular negative) valve shut-off element and/or the (in particular negative) valve seat can expediently be formed on one or more of the valves disclosed herein, for example on the rinsing-air valve, rinsing-agent valve, release valve and/or rinsing valve.

It is possible that the rinsing-agent line includes a plurality of individual lines opening out into the main line. For this purpose, the rinsing-agent line can, for example, be divided into several individual lines leading into the main line. The different individual lines can preferably be realised like the rinsing-agent line.

The rinsing apparatus can, for example, have a preferably solid pipe body (for example a pipe block), inside which the main line and the rinsing-agent line run and/or inside which the mouth opening is formed.

The inflow (in particular the injection) of rinsing agent into the rinsing air can preferably be realised in the pipe body.

The pipe body can be, for example, a metal body or a plastic body, for example produced by a casting or injection moulding process or a 3D printing process.

The main line in the pipe body can, for example, be realised as a single line (expediently as a borehole) or as a plurality of individual lines (for example individual boreholes). Alternatively or additionally, the rinsing-agent line in the pipe body can, for example, be realised as a single line (expediently as a borehole) or as a plurality of individual lines (for example individual boreholes). The main line and/or the rinsing-agent line can thus be conveniently divided into a plurality of individual lines.

The different individual lines of the main line can preferably be realised like the main line.

The embodiment with individual lines preferably enables a stronger and more even atomisation and/or mixing.

The pipe body together with the main line and the rinsing-agent line can be manufactured, for example, by a casting or injection moulding process or a 3D printing process.

It is possible that the rinsing-agent line and/or the mouth opening in the pipe body has a smaller flow cross-section than the main line in the pipe body.

It is possible that the main line has a rinsing-air valve configured as a single valve for opening and closing a supply of rinsing air. Alternatively or additionally, the rinsing-agent line can have a rinsing-agent valve configured as an individual valve for opening and closing a supply of rinsing agent.

The rinsing-air valve and/or the rinsing-agent valve can, for example, be disposed upstream of the mouth opening and/or the pipe body.

It is possible that the main line has a rinsing-air/rinsing-agent valve (expediently a release valve) configured as a single valve for opening and closing a supply of rinsing-air/rinsing-agent mixture.

The rinsing-air/rinsing-agent valve can, for example, be disposed downstream of the mouth opening and/or the pipe body.

It is possible that the rinsing-air/rinsing-agent valve is integrated into the application-agent changeover unit, for example.

It is possible that the pipe body and, alternatively or additionally, the rinsing-air valve and/or the rinsing-agent valve is disposed outside the application-agent changeover unit, for example is attached to it or spatially separated from it.

The rinsing-air valve, the rinsing-agent valve and/or the rinsing-air/rinsing-agent valve can each preferably be configured as a single valve, so that the said valves can preferably each have their own valve body and/or be spatially separated from one another.

It is possible that the rinsing apparatus includes a rinsing valve realised in particular as a single valve or is even configured as a rinsing valve.

It is possible that the main line and/or rinsing-agent line run in the rinsing valve, so that the rinsing valve can form a common rinsing valve for the main line and the rinsing-agent line.

Alternatively or additionally, the mouth opening can preferably be disposed in the rinsing valve. The rinsing valve can, for example, be disposed outside the application-agent changeover unit, for example it can be attached to it or spatially separated from it, or it can be at least partially integrated into the application-agent changeover unit.

In the embodiment with the rinsing valve, it is possible that the rinsing apparatus is realised as a rinsing valve (in particular configured as a single valve).

The rinsing valve preferably includes at least one (for example elongated and/or groove-shaped) inlet for the main line and at least one (for example elongated and/or groove-shaped) inlet for the rinsing-agent line.

The rinsing valve can, for example, be designed to open and close a supply of rinsing air. Opening and closing can preferably take place by opening and closing the inlet opening for the main line. In this way, the function of a rinsing-air valve can be realised, for example.

Alternatively or additionally, the rinsing valve can, for example, be designed to open and close a supply of rinsing agent. Opening and closing can preferably take place by opening and closing the inlet opening for the rinsing-agent line. In this way, the function of a rinsing-agent valve can be realised, for example.

The rinsing valve can, for example, be configured to open and close a valve seat for the dispensing of rinsing-air/rinsing-agent mixture. The valve seat can be opened and closed in particular by means of a movable valve shut-off element. In this way, the function of a rinsing-air/rinsing-agent valve (in particular a release valve) can be realised, for example.

The rinsing valve can, for example, have a first preferably movable valve plunger and/or a second preferably movable valve plunger (for example valve needle).

The first valve plunger and the second valve plunger can preferably be accommodated in a common valve body, in particular a common valve housing.

It is possible that the main line extends (for example obliquely and/or non-axially) through the first valve plunger and/or extends (substantially axially) through the second valve plunger. The main line can thus preferably run inside the first valve plunger and/or inside the second valve plunger.

It is possible that the rinsing-agent line extends (for example obliquely and/or non-axially) through the first valve plunger and/or the mouth opening is formed in the first valve plunger, preferably at least slightly spaced apart from the outer periphery of the second valve plunger.

It is possible that the rinsing-agent line and/or the mouth opening in the first valve plunger has a smaller flow cross-section than the main line in the first valve plunger and/or in the second valve plunger.

The flow cross-section of the main line in the second valve plunger can preferably be larger than the flow cross-section of the rinsing-agent line and/or the main line in the first valve plunger.

The second valve plunger can, for example, extend through the first valve plunger.

The first valve plunger and the second valve plunger can, for example, be disposed substantially coaxially and/or be movable relative to one another.

The first valve plunger can, for example, have a valve inlet opening for the main line and a valve inlet opening for the rinsing-agent line.

It is possible that the first valve plunger is configured, by moving, to open and close at least one of the valve inlet openings (expediently the valve inlet opening for the main line and/or the valve inlet opening for the rinsing-agent line).

The main line and/or the rinsing-agent line preferably leads into the first valve plunger via the lateral surface of the first valve plunger.

The main line preferably leads via the lateral surface of the second valve plunger into the second valve plunger and then preferably extends substantially axially in the second valve plunger to an outlet opening.

The rinsing valve can, for example, have a first control input, in particular in the form of a first control air connection, for moving the first valve plunger and/or a second control input, in particular in the form of a second control air connection, for moving the second valve plunger.

It is possible that, by means of the first control input, the first valve plunger can be brought to an open position against the action of a return element (for example a spring element), for example in such a way that the main line and/or the rinsing-agent line is opened.

The first valve plunger can, for example, be designed in such a way that the main line or the rinsing-agent line is (in particular always) in the open position and preferably independently of the position of the first valve plunger. For this purpose, the inlet opening of the main line or the inlet opening of the rinsing-agent line can be of, for example, elongated and/or groove-shaped design, in particular in the movement direction of the first valve plunger.

It is possible that, by means of the second control input, the second valve plunger can be brought to an open position against the action of a return element (for example a spring element), for example in order to open the valve seat by means of the valve shut-off element.

The rinsing air and the rinsing agent and preferably the rinsing-air/rinsing-agent mixture can be introduced into the second valve plunger, for example via an inlet opening. The inlet opening is preferably formed in a lateral surface of the second valve plunger.

The second valve plunger can also have, for example, an outlet opening, in particular in its lateral surface, through which the rinsing-air/rinsing-agent mixture can flow out.

The first valve plunger can, for example, be connected to at least one leakage opening, in particular to prevent undesired mixing between, for example, control air and rinsing air, rinsing air and rinsing agent, etc.

The second valve plunger can, for example, carry a valve shut-off element for opening and closing a valve seat.

The rinsing apparatus may, for example, have a seal, preferably a diaphragm seal, for sealing a valve plunger (for example a valve needle). The use of a diaphragm seal instead of, for example, wiping needle seals can advantageously increase operational reliability, tightness and thus valve service life.

The diaphragm seal can be used, for example, to seal the second valve plunger in particular.

The diaphragm seal can preferably surround the (in particular second) valve plunger and/or be co-movable with the (in particular second) valve plunger. For this purpose, the diaphragm seal can be attached to the (in particular second) valve plunger, for example.

A non-return valve, for example, can be integrated into the rinsing valve, preferably into the second valve plunger. The non-return valve can, for example, be disposed between the inlet opening and the outlet opening of the second valve plunger.

It is possible that the main line in the first valve plunger expediently has a plurality of individual lines. Alternatively or additionally, the rinsing-agent line can expediently have a plurality of individual lines in the first valve plunger.

It is possible that the main line has an intermediate chamber (for example an annular chamber) in the rinsing valve into which the mouth opening opens out and/or through which the main line extends. This makes it possible, for example, for the rinsing air and the rinsing agent to be introduced into the intermediate chamber, preferably in order to be mixed in the intermediate chamber and/or in the second valve plunger.

The intermediate chamber is preferably disposed between the first valve plunger and the second valve plunger and can expediently be delimited by the first valve plunger and the second valve plunger.

The inflow of rinsing agent into the rinsing air and/or its mixing can take place, for example, in the rinsing valve, preferably in the intermediate chamber and/or in the second valve plunger.

The intermediate chamber can preferably form part of the main line.

The individual lines of the main line and/or the individual lines of the rinsing-agent line can open out, for example, in the intermediate chamber or in or opposite the second valve plunger (in particular its inlet opening).

The valve shut-off element can, for example, be equipped with a preferably circumferential and/or annular plastic or elastomer seal. In this way, an increased sealing effect can preferably be realised even when the seat of the seal begins to wear, thereby increasing the valve's service life.

It should be noted that the disclosure includes, for example, embodiments in which (in particular only) rinsing agent is supplied preferably at the beginning of the rinsing operation, but also embodiments in which, for example, (in particular only) rinsing air is supplied at the beginning of the rinsing operation. In particular, it also includes embodiments in which rinsing air and rinsing agent are supplied together at the beginning of the rinsing operation.

It should also be noted that the disclosure includes, for example, embodiments in which the rinsing valve and/or the rinsing-air valve can preferably be spatially separated from the application-agent main channel, whereby, advantageously, deposits of application agent on its valve seat can at least be reduced.

The disclosure includes, as subject-matter of protection, not only a rinsing apparatus, but also an arrangement with the rinsing apparatus, an application-agent changeover unit (for example a colour changer) and preferably an application device (for example an atomiser or print head) and/or a dosing device (for example a dosing pump).

The main line of the rinsing apparatus preferably opens out into the application-agent main channel of the application-agent changeover unit.

The main line can thus preferably be connected to an application-agent main channel of an application-agent changeover unit, in particular in order to rinse the application-agent main channel and/or an application device suppliable with application agent from the application-agent main channel (in particular its at least one application-agent line) with the rinsing-air/rinsing-agent mixture.

Alternatively or additionally, the main line can be connected, for example, to the dosing device via the application-agent main channel, preferably in order to rinse the dosing device.

It is possible that the rinsing apparatus is connected to the dosing device in order to rinse the dosing device. The rinsing of the dosing device can, for example, comprise the alternate opening and closing of a bypass valve in a bypass line bypassing the dosing device and preferably also the opening of a return valve in a return line of the dosing device, via which, for example, the rinsing air and/or the rinsing agent (in particular the rinsing-air/rinsing-agent mixture) can be discharged into a suitable collecting container. This means that a separate rinsing connection on the dosing device can preferably be dispensed with.

In particular, an area between flat gear wheel surfaces of the dosing device can be advantageously rinsed free of application medium by (expediently) briefly opening the return valve.

During rinsing operation, the dosing device can run simultaneously (in particular slowly) so that, expediently, all interdental spaces of the dosing device can be cleaned.

In this case the bypass line can expediently be fed by the rinsing-air/rinsing-agent mixture.

The main rinsing volume preferably passes, in particular when the bypass valve is closed and the return valve is closed, through a gearwheel pair of the dosing device and then on through the application device and into its return line.

The main line can, for example, connect to the application-agent main channel at an upstream end, for example in the direction of flow at substantially the rearmost point of the application-agent main channel.

The main line can, for example, connect to the application-agent main channel in order to rinse the entire application-agent main channel with the rinsing-air/rinsing-agent mixture and/or so that all application-agent feeds of the application-agent changeover unit are downstream in the flow direction of the rinsing-air/rinsing-agent mixture.

It is possible that the main line is connected via the application agent-main channel to an application device for applying an application agent (for example paint) in order to rinse the application device, in particular by means of the rinsing-air/rinsing-agent mixture.

During rinsing operation, the rinsing-air/rinsing-agent mixture can, for example, be led to a closed valve (in particular a main needle valve) in the application device and be led out of the application device again via a return line preferably having a return valve.

The application device can be, for example, an atomiser, in particular a rotary atomiser (for example a bell-cup atomiser), or a print head. The application agent to be applied is preferably a paint, in particular for painting motor vehicle bodies and/or their attachments.

The dosing device is preferably used to convey the application agent to be applied.

Rinsing is preferably carried out via the media pressures of the rinsing air and the rinsing agent. Expediently, the dosing device can in this case, for example, run simultaneously only slowly, in particular so that the interdental spaces of the dosing pump can be cleaned.

It is possible that the rinsing apparatus (for example the valves preferably configured as individual valves or the rinsing valve) has a switching position in which rinsing air and rinsing agent are supplied simultaneously in order to continuously introduce, in particular inject, rinsing agent into the rinsing air and thus generate the continuous flow of rinsing-air/rinsing-agent mixture.

The application-agent changeover unit (for example colour changer) can, in particular, have a plurality of application-agent feeds for supplying different application agents (in particular differently coloured application agents), with the individual application-agent feeds opening out into the application-agent main channel.

It should be noted that the rinsing apparatus can also be used, for example, to rinse the following: a docking type colour changer, at least one valve station in one or more paint application set-ups, one or more piggable lines, for example in a special paint supply system, and/or an atomiser in an atomiser cleaning device.

In the context of the disclosure, the "rinsing" feature may preferably also include "cleaning" in general. In the context of the disclosure, the "rinsing air" feature can also expediently include, for example, other suitable gases in general.

The flow direction mentioned here preferably refers to the flow direction of the rinsing air, the rinsing agent and/or the rinsing-air/rinsing-agent mixture during rinsing operation.

The disclosure also relates to a rinsing method which can preferably be carried out with a rinsing apparatus as disclosed herein. The rinsing method and in particular the rinsing apparatus are used in particular to rinse an application-agent main channel of an application-agent changeover unit and preferably includes a continuous inflow (for example injection) of a rinsing agent into a flow of rinsing air.

During the rinsing process, rinsing air is transported in a main line and a rinsing agent is transported in a rinsing-agent line (for example configured as a secondary line).

The rinsing method is characterised in particular in that the rinsing-agent line opens out into the main line by way of a mouth opening, so that a preferably continuous flow of rinsing-air/rinsing-agent mixture is generated, in particular to be introduced into the application-agent main channel.

It is possible that the disclosure also includes, as subject-matter of protection, the rinsing valve per se, but also generally, for example in the form of a fluid valve, in particular a paint valve.

It should here be noted that the disclosure may include, as subject-matter of protection, the rinsing valve per se, but generally in the form of a fluid valve (in particular in the form of a paint valve) and consequently, in particular, independently of the rinsing function and rinsing application disclosed herein.

The rinsing air referred to here may be replaced, for example, by a first paint or a first hardener and the rinsing agent referred to here may be replaced, for example, by a second paint or a second hardener. The main line can be, for example, a first paint or hardener line. Alternatively or additionally, the rinsing-agent line can, for example, be a second paint or hardener line.

The fluid valve can, for example, be configured to switch back and forth between two paint supply lines and/or to release either one or the other connection downstream via a release valve. There could also be, for example, two different colours that are released alternately, so that the fluid valve can serve as a colour change valve (like a mini colour changer, so to speak). It is also possible to supply, for example, two clear coats or two different hardeners, or, for example, one (base) coat and one hardener together to mix them.

The fluid valve can be fed, for example, with two clear coats or, for example, two different hardeners or, for example, with one base coat and one hardener in order to be able to mix the base coat and hardener together.

The preferred embodiments of the disclosure described by reference to the Figures are partly identical, with the same reference numbers being used for similar or identical parts, and with reference also being made to the descriptions of other embodiments in order to explain them.

FIG. 1 shows a schematic view of a rinsing apparatus 100 according to an embodiment of the disclosure.

The rinsing apparatus 100 (for example a cleaning apparatus) serves for connection to an application-agent main channel 201 of an application-agent changeover unit 200 (for example, FIGS. 4, 5 and 6) and preferably for the continuous inflow of a rinsing agent S2 into a flow of rinsing air S1. By means of the rinsing apparatus 100, it is also possible in particular to rinse an application device 300 (for example, an atomiser or print head) and, for example, a dosing device 400 (for example, a dosing pump) (for example, FIGS. 4, 5 and 6).

The rinsing apparatus 100 includes a main line 1 for transporting the rinsing air S1 and a rinsing-agent line 2, in particular configured as a secondary line, for transporting the rinsing agent S2.

The rinsing-agent line 2 opens out into the main line 1 by means of a mouth opening 2.1 in order to be able to inject the rinsing agent S2 into the rinsing air S1. This allows a preferably continuous flow of a rinsing-air/rinsing-agent mixture S3 to be generated.

The direction of the arrows for reference numbers S1, S2 and S3 indicates the corresponding flow direction during rinsing operation.

The rinsing-air/rinsing-agent mixture S3 is introduced into the application-agent main channel 201 in order to rinse the application-agent main channel 201, so that application-agent residues contained therein can be rinsed out for a change of application agent.

Upstream of the mouth opening 2.1, during rinsing operation the main line 1 preferably serves to transport only rinsing air S1. Downstream of the mouth opening 2.1, the main line 1 serves in particular to transport the rinsing-air/rinsing-agent mixture S3 during rinsing operation.

The rinsing-agent line 2 and its mouth opening 2.1 have a smaller flow cross-section than the main line 1, particularly in the mouth area. Furthermore, the rinsing-agent line 2 can have, for example, a throttle point or nozzle 3 upstream of the mouth opening 2.1. In this way, the flow rate of the rinsing agent S2 can be increased and/or controlled and the rinsing agent consumption can be further reduced.

The rinsing agent S2 can be injected continuously into the rinsing air S1, for example in atomised form, to generate an aerosol and achieve effective mixing between rinsing agent S2 and rinsing air S1 and thus a well-mixed rinsing-air/rinsing-agent mixture S3.

The rinsing-agent line 2 can, for example, project into the main line 1, for example in such a way that the rinsing-agent line 2 and, in particular, the mouth opening 2.1 is aligned substantially parallel to the direction of flow in the main line 1. The mouth opening 2.1 can, for example, be disposed substantially centrally in the flow cross-section of the main line 1.

Figure 2:
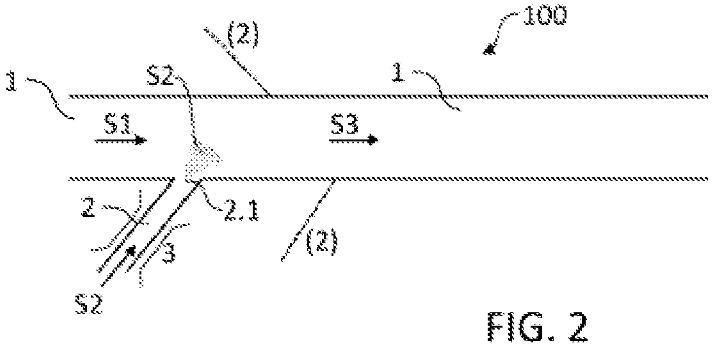
FIG. 2 shows a schematic view of a rinsing apparatus according to another embodiment of the disclosure.

FIG. 2 shows a schematic view of a rinsing apparatus 100 according to another embodiment of the disclosure.

Here, the rinsing-agent line 2 is connected to the main line 1 in such a way that the rinsing-agent line 2 and in particular the mouth opening 2.1 opens out into the main line 1 inclined towards the direction of flow in the main line 1.

The reference numbers 2 in brackets schematically show an embodiment in which the rinsing-agent line 2 includes a plurality of individual lines opening out into the main line 1, whereby the mixing between rinsing air S1 and rinsing agent S2 can be improved. The individual lines can be realised like the rinsing-agent line 2 or be suitably modified, for example have different spray nozzles.

Figure 3:
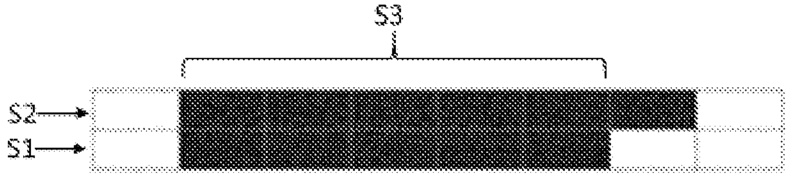
FIG. 3 shows a rinsing program for a rinsing apparatus according to an embodiment of the disclosure.

FIG. 3 shows a rinsing program for a rinsing apparatus 100 according to an embodiment of the disclosure.

The rinsing apparatus 100 includes a switching position for performing a rinsing operation in which the rinsing air S1 and the rinsing agent S2 are supplied simultaneously so as to produce a continuous inflow of rinsing agent S2 into the rinsing air S1 and thus a continuous flow of a rinsing-air/rinsing-agent mixture S3.

The continuous inflow of rinsing agent S2 via the throttle point or nozzle 3 and the mouth opening 2.1 into the flow of rinsing air 1 (in particular an unpulsed, continuous flow of rinsing air) and the continuous rinsing from the preferably rearmost point of the application-agent changeover unit 200 in the direction of flow into a return line 302 in the application device 300 (for example, FIGS. 4, 5 and 6) advantageously leads to a significant reduction in the consumption of rinsing agent. This can also advantageously reduce the required rinsing time.

Especially preferred is a continuous inflow of rinsing agent S2 into the flow of rinsing air 1 from the beginning of the rinsing section to the end of the rinsing section (for example, FIGS. 4, 5 and 6), and preferably without cyclical switching between rinsing air S1 and rinsing agent S2.

Figure 4:
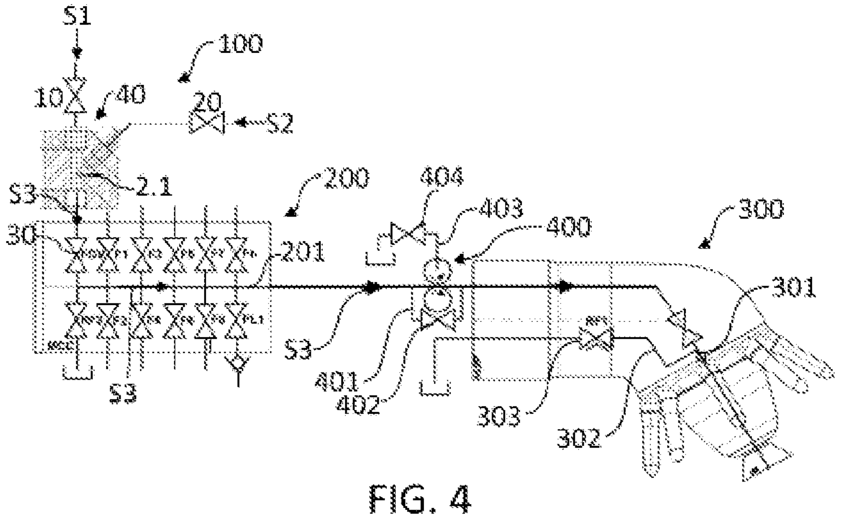
FIG. 4 shows a rinsing apparatus with an application-agent changeover unit, a dosing device and an application device according to an embodiment of the disclosure.

FIG. 4 shows a rinsing apparatus 100 with an application-agent changeover unit 200, a dosing device 400 (for example, a dosing pump) and an application device 300 (for example, a rotary atomiser with external charging) according to one embodiment of the disclosure.

FIG. 4 shows a rinsing apparatus 100 with, in particular, a rinsing-air valve 10, a rinsing-agent valve 20 and a rinsing-air/rinsing-agent valve 30 (release valve). The rinsing-air valve 10, the rinsing-agent valve 20 and the rinsing-air/rinsing-agent valve 30 are each configured as individual valves.

The rinsing-air valve 10 is disposed upstream of the mouth opening 2.1 in the main line 1 and serves to open and close a supply of rinsing air S1.

The rinsing-agent valve 20 is disposed upstream of the mouth opening 2.1 in the rinsing-agent line 2 and serves to open and close a supply of rinsing agent S2.

The rinsing-air/rinsing-agent valve 30 is disposed downstream of the mouth opening 2.1 in the main line 1 and serves to open and close a supply of rinsing-air/rinsing-agent mixture S3 into the application-agent main channel 201. The rinsing-air/rinsing-agent valve 30 can be integrated in the application-agent changeover unit 200, for example.

The application-agent changeover unit 200 includes in particular a plurality of application-agent feeds for supplying different application agents (in particular differently coloured application agents), with the individual application-agent feeds opening out into the application-agent main channel 201. The application agent to be applied can then be supplied, via the application-agent main channel 201 and by means of the dosing device 400, to the application device 300 for application.

During rinsing operation, the rinsing-air/rinsing-agent mixture S3 is led via the application-agent main channel 201 to a closed valve (for example a main needle valve) 301 in the application device 300 and led out of the application device 300 again via a return line 302 preferably comprising a return valve 303, for example into a suitable collection container, etc.

The rinsing apparatus 100 is connected to the dosing device 400 so as to be able also to rinse the dosing device 400 by means of the rinsing-air/rinsing-agent mixture S3. The dosing device 400 can be rinsed in particular by alternately opening and closing a bypass valve 402 in a bypass line 401 bypassing the dosing device 400 and preferably additionally by opening a return valve 404 in a return line 404 connected to the dosing device 400. This means that a separate rinsing connection on the dosing device 400 can preferably be dispensed with. Either a rinsing connection on the dosing device 400 can be deactivated (for example closed), or the dosing device 400 does not have a separate rinsing connection.

Figure 5:
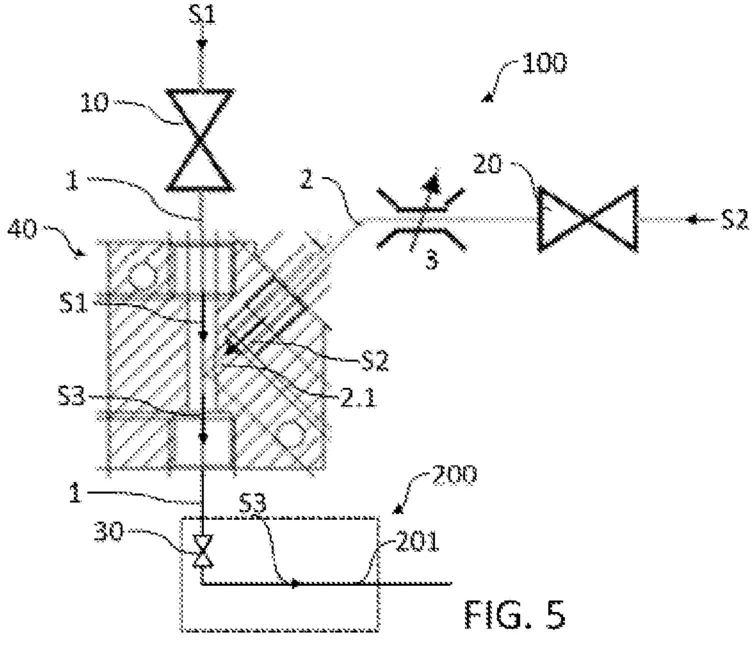
FIG. 5 shows a schematic view of a rinsing apparatus, in particular with a rinsing-air valve, rinsing-agent valve and rinsing-air/rinsing-agent valve, according to an embodiment of the disclosure.

The rinsing apparatus 100 includes a pipe body (for example a pipe block) 40, shown enlarged in FIG. 5, inside which the main line 1 and the rinsing-agent line 2 run and inside which the mouth opening 2.1 is formed. The inflow of rinsing agent S2 into the rinsing air S2 can thus take place in the pipe body 40.

The pipe body 40 is preferably a substantially solid plastic or metal body that can be manufactured together with the main line 1 and the rinsing-agent line 2, for example by a casting or injection moulding process or a 3D printing process.

It is possible that the rinsing-air/rinsing-agent valve 30 is integrated into the application-agent changeover unit 200, but the rinsing-air valve 10 and the rinsing-agent valve 20 are disposed outside the application-agent changeover unit 200, for example are attached to it or are spatially separated from it.

Figure 6:
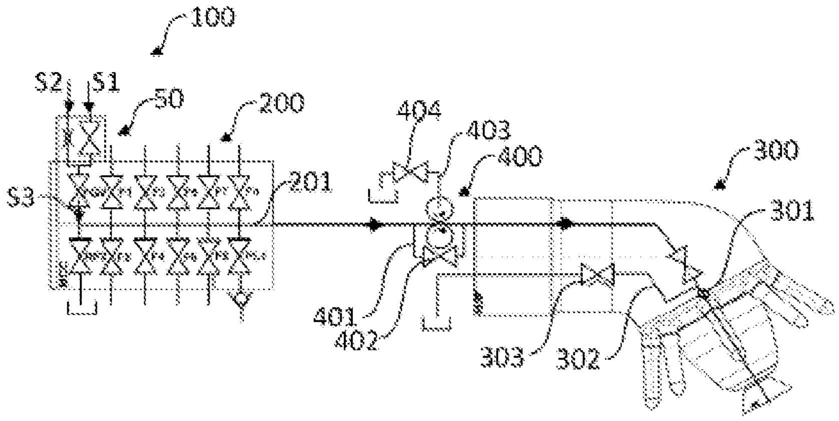
FIG. 6 shows a rinsing apparatus with an application-agent changeover unit, a dosing device and an application device according to an embodiment of the disclosure.
Figure 7:
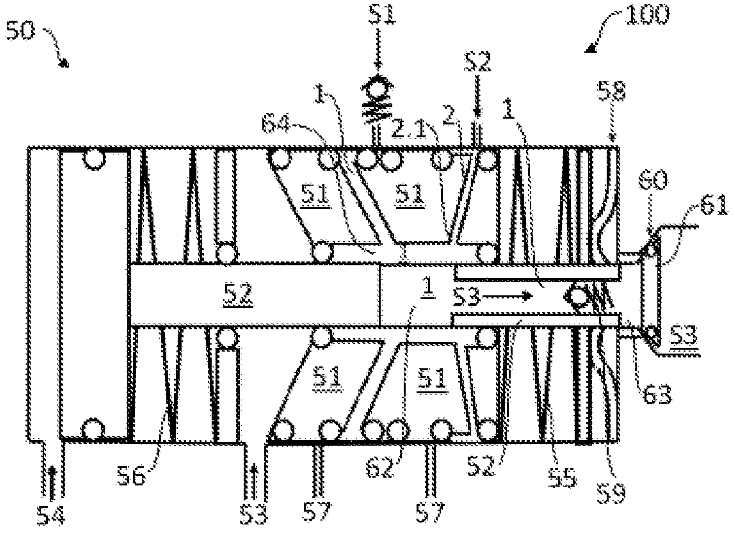
FIG. 7 shows a rinsing apparatus, in particular a rinsing valve, according to an embodiment of the disclosure.

FIG. 6 shows a rinsing apparatus 100 with an application-agent changeover unit 200, a dosing device 400 and an application device 300 according to an embodiment of the disclosure.

FIG. 6 schematically illustrates a single rinsing valve 50 which can advantageously provide the valve functions of the rinsing-air valve 10, the rinsing-agent valve 20 and the rinsing-air/rinsing-agent valve 30.

The rinsing valve 50 is described with reference to FIGS. 7 to 10.

A special feature of the rinsing valve 50 is that both the main line 1 and the rinsing-agent line 2 run in the rinsing valve 50, and preferably the mouth opening 2.1 is also formed in the rinsing valve 50. The main line 1 and the rinsing-agent line 2 can thus run in a common rinsing valve 50.

The rinsing valve 50 serves to open and close a supply of rinsing air S1, in particular a valve inlet opening for the main line 1.

The rinsing valve 50 serves to open and close a supply of rinsing agent S2, in particular a valve inlet opening for the rinsing-agent line 2.

The rinsing valve 50 serves to open and close a valve seat 60 by means of a valve shut-off element 61 and thus to open and close a supply of rinsing-air/rinsing-agent mixture S3. The valve shut-off element 61 can expediently be equipped with a preferably circumferential or annular plastic or elastomer seal.

A first movable valve plunger 51 and a second movable valve plunger 52 are integrated into the rinsing valve 50, with the second valve plunger 52 preferably extending substantially coaxially through the first valve plunger 51.

The first valve plunger 51 includes the valve inlet opening for the main line 1 and the valve inlet opening for the rinsing-agent line 2.

The inlet opening for the rinsing-agent line 2 can, for example, be elongated and thus be opened independently of the switching position of the first valve plunger 51. The inlet opening for the main line 1, on the other hand, can be opened and closed by moving the first valve plunger 51. However, embodiments are also possible in which the inlet opening of the main line 1 is elongated and thus opened independently of the switching position of the first valve plunger 51, it being possible to open and close the inlet opening for the rinsing-agent line 2 by moving the first valve plunger 51.

The second valve plunger 52 carries the valve shut-off element 61 for opening and closing the valve seat 60. The second valve plunger 52 includes an inlet opening 62 in its lateral surface, via which the rinsing air S1, the rinsing agent S2 and/or the rinsing-air/rinsing-agent mixture S3 can be introduced into the second valve plunger 52. The second valve plunger 52 further includes an outlet opening 63 in its lateral surface, via which the rinsing-air/rinsing-agent mixture S3 can be led out of the second valve plunger 52.

The main line 1 extends in the direction of flow firstly in the first valve plunger 51 and then expediently indirectly or directly through the second valve plunger 52. In the first valve plunger 51, the main line 1 can be provided in the form of one line (with a suitably large flow cross-section) or in the form of a plurality of individual lines (with suitably small flow cross-sections). The main line 1 can be provided, for example, in the form of one or more boreholes.

The rinsing-agent line 2 preferably only runs in the first valve plunger 51, so that the first valve plunger 51 can have the mouth opening 2.1. The rinsing-agent line 2 can, for example, be provided in the form of one line (with a suitably large flow cross-section) or in the form of a plurality of individual lines (with suitably small flow cross-sections). The rinsing-agent line 2 can be provided, for example, in the form of one or more boreholes.

The main line 1 runs preferably obliquely in the first valve plunger 51 and/or preferably in a plurality of individual lines in the first valve plunger 51.

The rinsing-agent line 2 runs preferably obliquely in the first valve plunger 51 and/or preferably in a plurality of individual lines in the first valve plunger 51.

The rinsing-agent line 2 and the mouth opening 2.1 in the first valve plunger 51 have a smaller flow cross-section than the main line 1 in the first valve plunger 51 and in the second valve plunger 52.

The rinsing valve 50 includes a first control input 53, in particular in the form of a first control air connection, for moving the first valve plunger 51. The first valve plunger 51 can be moved against the action of a return element 55 to open the main line 1 (in particular its valve inlet opening).

The rinsing valve 50 includes a second control input 54, in particular in the form of a second control air connection, for moving the second valve plunger 52. The second valve plunger 52 can be brought to an open position against the action of a return element 56 in order to open the valve seat 60 by means of the valve shut-off element 61 and thus enable a supply of rinsing-air/rinsing-agent mixture S3 (in particular release valve function).

The first valve plunger 51 may also be connected to one or more leakage openings 57 to prevent undesired mixing of the different fluids (for example, control air, rinsing air, rinsing agent, etc.).

At least one leakage opening 57 is expediently disposed between the control connection 53 and the main line 1 running in the first valve plunger 51, and at least one leakage opening 57 is expediently disposed between the main line 1 running in the first valve plunger 51 and the rinsing-air line 2 to prevent mixing thereof in the event of a seal defect.

A seal 58 in the form of a diaphragm seal surrounds the second valve plunger 52 and is connected to the second valve plunger 52 so as to move with the second valve plunger 52.

A non-return valve 59 can be integrated into the rinsing valve 50, in particular into the second valve plunger 52.

The main line 1 may expediently comprise an intermediate chamber 64 (for example an annular chamber) in the rinsing valve 50, into which the mouth opening 2.1 may open and through which the main line 1 may extend. Both the rinsing air S1 and the rinsing agent S2 can thus be introduced into the intermediate chamber 64 in order to be mixed in the intermediate chamber 64 and/or in the second valve plunger 52. The intermediate chamber 64 is preferably delimited by an inner area of the first valve plunger 51 and an outer area of the second valve plunger 52.

Figure 8:
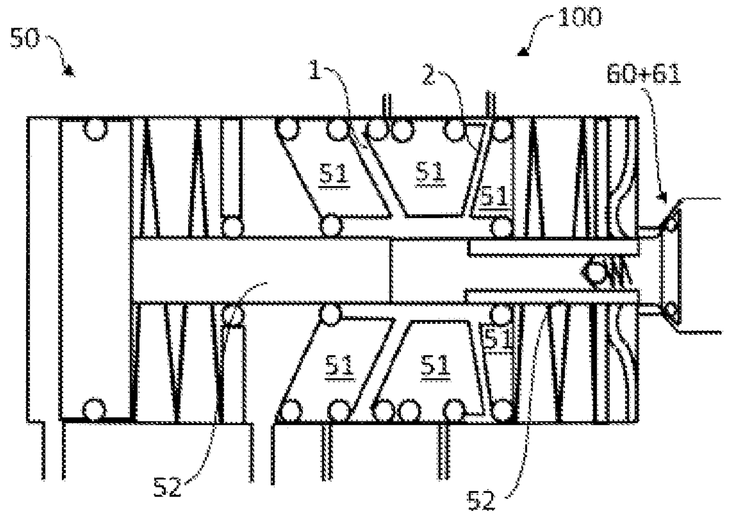
FIG. 8 shows the rinsing apparatus of FIG. 7 with the valve seat closed, the rinsing-air line closed and the rinsing-agent line open.
Figure 9:
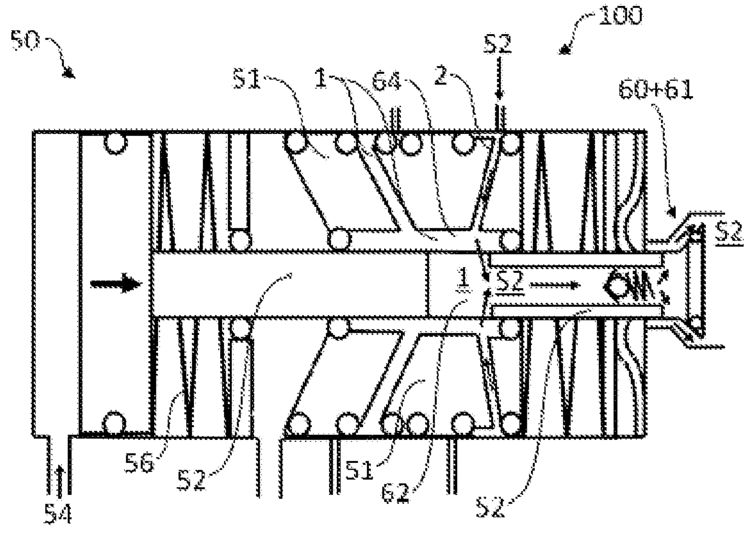
FIG. 9 shows the rinsing apparatus of FIGS. 7 and 8 with the valve seat open, the rinsing-air line closed and the rinsing-agent line open.
Figure 10:
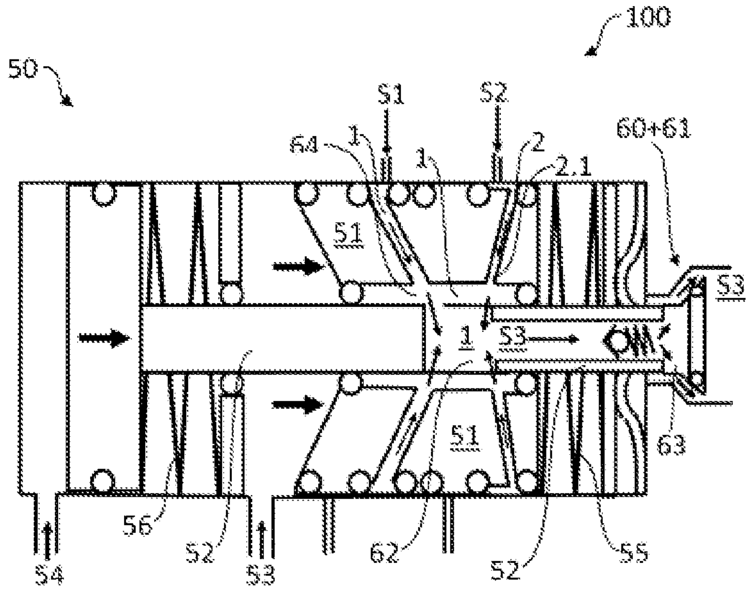
FIG. 10 shows the rinsing apparatus of FIGS. 7 to 9 with the valve seat open, the rinsing-air line open and the rinsing-agent line open.
Figure 12:
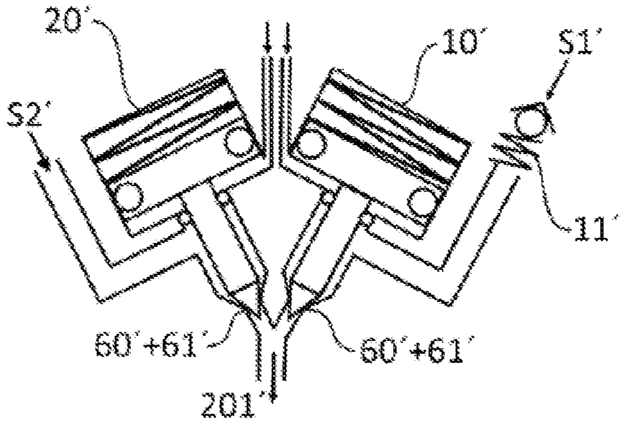
Prior Art FIG. 12
FIG. 12 shows a rinsing apparatus according to the state of the art.
Figure 13:
Prior Art FIG. 13
FIG. 13 shows a rinsing program according to the state of the art.

FIGS. 8 to 10 illustrate the mode of operation and in particular different switching positions of the rinsing valve 50.

FIG. 8 shows the rinsing valve 50 with the valve seat 60 closed by the valve shut-off element 61 and with the valve inlet opening for the main line 1 closed by the first valve plunger 51.

The valve inlet opening for the rinsing-agent line 2 is open regardless of the switching position of the first valve plunger 51.

FIG. 9 shows the rinsing valve 50 with the valve seat 60 opened by the valve shut-off element 61 and with the valve inlet opening for the main line 1 closed by the first valve plunger 51.

The valve inlet opening for the rinsing-agent line 2 is open regardless of the switching position of the rinsing valve 50, so that the rinsing agent S2 can flow through the rinsing valve 50. This allows the valve seat 60 to be backwashed with rinsing agent S2 so that deposits in the valve seat 60 can be rinsed away.

The valve shut-off element 61 opens the valve seat 60 because the second valve plunger 52 is moved to the right FIG. 9 by means of the control connection 54 against the action of the return element 56 in.

FIG. 10 shows the rinsing valve 50 with the valve seat 60 opened by the valve shut-off element 61 and with the valve inlet opening for the main line 1 opened by the first valve plunger 51.

The inlet opening for the main line 1 is opened because the first valve plunger 51 is moved to the right in FIG. 10 by means of the control connection 53 against the action of the return element 55.

The valve inlet opening for the rinsing-agent line 2 remains open regardless of the switching position and thus despite movement of the first valve plunger 51, because the valve inlet opening is elongated in the direction of movement of the first valve plunger 51.

The rinsing-agent line 2 opens out into the main line 1 by means of its opening 2.1, in particular into the intermediate chamber 64 of the main line 1 through which the rinsing air S2 flows.

The continuous injection of rinsing agent S2 into the rinsing air S1 thus takes place in the main line 1 within the rinsing valve 50, and preferably in the intermediate chamber 64. Mixing can take place in the intermediate chamber 64 and/or in the second valve plunger 52.

In particular, the control connection 54 serves to open the valve seat 60 by moving the second valve plunger 52 so that the rinsing agent S2 can flow first to the application-agent main channel 201.

The control connection 53 serves in particular to open the inlet opening for the main channel 1 by moving the first valve plunger 51, so that rinsing air S1 is supplied second in addition to rinsing agent S2. This can enable a continuous flow of rinsing agent S2 into the rinsing air S1, in the rinsing valve 50 itself, in order to achieve a particularly continuous flow of rinsing-air/rinsing-agent mixture S3 from the rinsing valve 50 towards the application-agent main channel 201.

In particular, the valve functions of valves 10, 20 and 30 can be realised with the rinsing valve 50. The rinsing valve 50 thus represents a compact, in particular space-saving, and installation-friendly embodiment.

In the idle state (in particular when no control air is supplied via the control connection 53 and 54), the rinsing valve 50 is preferably (securely) closed by spring force. Spring loading is expediently realised by the return elements 55 and 56.

Another special feature of the rinsing valve 50 is that the valve seat 60 and the valve shut-off element 61 widen in the direction of flow (for example, become radially larger, expediently in steps or substantially continuously, for example conically), thus forming in particular a negative valve seat 60. In particular, this enables the valve shut-off element 61 to be pressed into a closed position in the event of overpressure (for example pressure surges) from the application-agent main channel 201, thereby reducing the risk of application agent from the application-agent main channel 201 entering the rinsing valve 50.

It should be noted that the main and rinsing-agent lines 1 and 2 running in the first valve plunger 51 can also be interchanged. Consequently, when the valve seat 60 is opened, rinsing air 51 can first flow through the rinsing valve 50 and, when the valve inlet opening for the rinsing-agent line 2 is additionally opened by the first valve plunger 51, rinsing agent S2 can be introduced into the flow of rinsing air S1.

The disclosure thus includes embodiments in which rinsing agent is supplied at the beginning of the rinsing operation, but also embodiments in which rinsing air is supplied at the beginning of the rinsing operation. Embodiments are even possible in which rinsing air and rinsing agent are supplied simultaneously at the beginning of the rinsing operation.

It should further be noted that the elongated valve inlet opening for the rinsing-agent line 2, which can be seen in FIGS. 7 to 10, can expediently be made shorter or narrower, so that when the first valve plunger 51 is disengaged and retracted, it is not possible to open the rinsing-agent line 2 and the main line 1 simultaneously, thus making the rinsing valve 50 structurally more secure.

It should also be noted that the rinsing valve 50 described with reference to FIGS. 7 to 10 can be configured, for example, as a pulsed rinsing valve (with preferably multiple and/or alternating changes between rinsing air, in particular pulsed air, and rinsing agent).

It is also pointed out that the rinsing valve 50 described with reference to FIGS. 7 to 10 can also be used for other applications. It can thus also be a fluid valve in general, in particular a paint valve.

FIG. 11 shows possible switching states of a rinsing apparatus 100, in particular of the rinsing valve 50.

LIST OF REFERENCES

1 Main line
2 Rinsing-agent line, in particular secondary line
2.1 Mouth opening
3 Throttle point or nozzle
S1 Rinsing air
S2 Rinsing agent, in particular rinsing liquid
S3 Rinsing-air/rinsing-agent mixture
10 Rinsing-air valve
20 Rinsing-agent valve
30 Rinsing-air/rinsing-agent valve, in particular release valve
40 Pipe body
50 Rinsing valve
51 First valve plunger
52 Second valve plunger, in particular valve needle
53 Control connection
54 Control connection
55 Return element
56 Return element
57 Leakage hole 58 Seal, in particular diaphragm seal
59 Non-return valve
60 Valve seat
61 Valve shut-off element
62 Inlet opening
63 Outlet opening
64 Intermediate chamber
100 Rinsing apparatus
200 Application-agent changeover unit, in particular colour changer
201 Application-agent main channel
300 Application device, in particular atomiser or print head
301 Valve, in particular main needle valve
302 Return line
303 Return valve
400 Dosing device, in particular dosing pump
401 Bypass line
402 Bypass valve
403 Return
404 Return valve

The invention claimed is:

1. A rinsing apparatus having an application agent main channel, the apparatus comprising:
 a main line for transporting a rinsing air;
 a rinsing-agent line for transporting a rinsing agent, the rinsing-agent line opening out into the main line via a mouth in order to generate a substantially continuous flow of a rinsing-air/rinsing-agent mixture to be introduced into the application-agent main channel; and
 a pipe body having an interior, the main line and the rinsing-agent line running inside the pipe body, and the mouth opening being formed from the main body.

2. The rinsing apparatus of claim 1, wherein the rinsing-agent line has a smaller flow cross-section than the main line.

3. The rinsing apparatus of claim 1 wherein the mouth opening has a smaller flow cross-section than the main line and/or is formed as a spray nozzle.

4. The rinsing apparatus of claim 3 wherein the rinsing-agent line has a throttle point or nozzle.

5. The rinsing apparatus of claim 1 wherein the rinsing agent is introduced into the flow of the main line in an atomised form.

6. The rinsing apparatus of claim 5 wherein the rinsing agent is continuously introduced into a preferably continuous flow of rinsing air.

7. The rinsing apparatus of claim 1 wherein the rinsing-agent line opens out into the main line substantially parallel to a direction of flow in the main line.

8. The rinsing apparatus of claim 1 further comprising a valve seat and a valve shut-off element, the valve shut off element widening in the direction of flow in order to be pressed into a closed position in the event of overpressure from the application-agent main channel.

9. The rinsing apparatus of claim 1 wherein the rinsing-agent line further comprises a plurality of individual lines opening out into the main line.

10. The rinsing apparatus of claim 1 wherein the main line in the pipe body comprises a plurality of individual lines.

11. The rinsing apparatus of claim 1 wherein the main line has a rinsing-air valve configured as an individual valve for opening and closing a supply of rinsing air and the rinsing-agent line has a rinsing-agent valve configured as an individual valve for opening and closing a supply of rinsing agent.

12. The rinsing apparatus of claim 11, wherein the rinsing-air valve and the rinsing-agent valve are configured upstream of the mouth opening and/or upstream of the pipe body.

13. The rinsing apparatus of claim 1 wherein the main line has a rinsing-air/rinsing-agent valve configured as an individual valve for opening and closing a supply of rinsing-air/rinsing-agent mixture and the rinsing-air/rinsing-agent valve is configured downstream of the mouth opening.

14. The rinsing apparatus of claim 1 wherein the rinsing apparatus has a diaphragm seal.

15. The rinsing apparatus of claim 14, wherein the diaphragm seal surrounds the second valve plunger and is co-movable with the second valve plunger.

16. The rinsing apparatus of claim 15 further comprising a non-return valve is integrated into the rinsing valve, preferably into the second valve plunger.

17. The rinsing apparatus of claim 1 wherein the main line is connected to an application-agent main channel of an application-agent changeover unit.

18. The rinsing apparatus of claim 17 wherein the main line connects to the application-agent main channel at an upstream end.

19. The rinsing apparatus of claim 18, wherein the main line connects to the application-agent main channel in order to rinse the entire application-agent main channel with the rinsing-air/rinsing-agent mixture so that all application-agent feeds of the application-agent changeover unit are downstream in the flow direction of the rinsing-air/rinsing-agent mixture.

20. The rinsing apparatus of claim 17 wherein the main line is connected, via the application-agent main channel and a dosing device, to an application device for applying an application agent for rinsing the application device and the dosing device.

21. The rinsing apparatus of claim 20 wherein during rinsing operation, the rinsing-air/rinsing-agent mixture is led to a closed valve in the application device and is led out of the application device again via a return line preferably having a return valve.

22. The rinsing apparatus of claim 1 wherein the rinsing apparatus is connected to a dosing device in order to rinse the dosing device, with rinsing of the dosing device involving the alternate opening and closing of a bypass valve in a bypass line bypassing the dosing device and additionally the opening of a return valve in a return line of the dosing device.

23. The rinsing apparatus of claim 1 wherein the rinsing apparatus has a switching position in which the rinsing air and the rinsing agent are supplied simultaneously in order to provide a continuous inflow of rinsing agent into the rinsing air and thus a continuous flow of rinsing-air/rinsing-agent mixture.

24. A rinsing apparatus having an application agent main channel, the apparatus comprising:
 a main line for transporting a rinsing air; and
 a rinsing-agent line for transporting a rinsing agent, the rinsing-agent line opening out into the main line via a mouth in order to generate a substantially continuous flow of a rinsing-air/rinsing-agent mixture to be introduced into the application-agent main channel;
 wherein the main line has a rinsing-air/rinsing-agent valve configured as an individual valve for opening and closing a supply of rinsing-air/rinsing-agent mixture and the rinsing-air/rinsing-agent valve is configured downstream of the mouth opening.

25. A rinsing apparatus having an application agent main channel, the apparatus comprising:

a main line for transporting a rinsing air;

a rinsing-agent line for transporting a rinsing agent, the rinsing-agent line opening out into the main line via a mouth in order to generate a substantially continuous flow of a rinsing-air/rinsing-agent mixture to be introduced into the application-agent main channel; and a rinsing valve in which the main line and the rinsing-agent line merge to form the mouth opening.

26. The rinsing apparatus of claim 25, wherein the rinsing valve is configured to open and close a supply of rinsing air, is configured to open and close a supply of rinsing agent, and is configured to open and close a valve seat with a valve shut-off element.

27. The rinsing apparatus of claim 26, wherein the rinsing valve comprises a first movable valve plunger and/or a second movable valve plunger.

28. The rinsing apparatus of claim 27, wherein the main line runs in the first valve plunger and runs in the second valve plunger.

29. The rinsing apparatus of claim 28, wherein the rinsing-agent line runs in the first valve plunger and/or the mouth opening is formed in the first valve plunger.

30. The rinsing apparatus of claim 29, wherein the second valve plunger extends through the first valve plunger, and/or the first valve plunger and the second valve plunger are disposed coaxially.

31. The rinsing apparatus of claim 30, wherein the first valve plunger has a valve inlet opening for the main line and a valve inlet opening for the rinsing-agent line and is configured, by moving, to open and close at least one of the valve inlet openings.

32. The rinsing apparatus of claim 31, wherein the rinsing valve further comprises:

a first control air connection, for moving the first valve plunger, and/or a second control air connection, for moving the second valve plunger.

33. The rinsing apparatus of claim 32, wherein the second valve plunger further comprises:

has an inlet opening in its lateral surface, and/or has an outlet opening in its lateral surface.

34. The rinsing apparatus of claim 32, wherein the first valve plunger is connected to at least one leakage opening.

35. The rinsing apparatus of claim 32, wherein the second valve plunger further comprises a valve shut-off element for opening and closing a valve seat.

36. The rinsing apparatus of claim 32, wherein the main line and/or the rinsing-agent line has a plurality of individual lines in the first valve plunger.

37. The rinsing apparatus of 32, wherein the rinsing agent is introduced into the rinsing air in the rinsing valve, an intermediate chamber of the main line.

* * * * *